US008831670B2

(12) United States Patent
Chang et al.

(10) Patent No.: US 8,831,670 B2
(45) Date of Patent: *Sep. 9, 2014

(54) PERFORMING A POWER BOOST IN A WIRELESS COMMUNICATION SYSTEM

(75) Inventors: Chu-Rui Chang, Plano, TX (US); Jacques Fluet, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 145 days.

This patent is subject to a terminal disclaimer.

(21) Appl. No.: 13/620,671

(22) Filed: Sep. 14, 2012

(65) Prior Publication Data

US 2013/0010749 A1  Jan. 10, 2013

Related U.S. Application Data

(63) Continuation of application No. 12/336,901, filed on Dec. 17, 2008.

(60) Provisional application No. 61/188,569, filed on Aug. 11, 2008, provisional application No. 61/188,609, filed on Aug. 11, 2008.

(51) Int. Cl.
| | | |
|---|---|---|
| *H04B 7/00* | (2006.01) | |
| *H04B 1/38* | (2006.01) | |
| *H04W 52/34* | (2009.01) | |
| *H04W 52/24* | (2009.01) | |
| *H04W 52/42* | (2009.01) | |

(52) U.S. Cl.
CPC .......... *H04W 52/346* (2013.01); *H04W 52/241* (2013.01); *H04W 52/42* (2013.01); *H04W 52/243* (2013.01)
USPC ............................ 455/522; 455/561; 455/571

(58) Field of Classification Search
USPC ........................................................ 455/522
See application file for complete search history.

(56) References Cited

U.S. PATENT DOCUMENTS

| 7,047,006 B2 * | 5/2006 | Classon et al. ................ 455/434 |
| 2002/0187799 A1 | 12/2002 | Haartsen |

(Continued)

FOREIGN PATENT DOCUMENTS

| CN | 1866776 | 11/2006 |
| EP | 1879306 | 1/2008 |

(Continued)

OTHER PUBLICATIONS

Office Action issued in Chinese Application No. 200980140604.3 on Nov. 5, 2013; 8 pages.

(Continued)

*Primary Examiner* — Temesgh Ghebretinsae
*Assistant Examiner* — Devan Sandiford
(74) *Attorney, Agent, or Firm* — Fish & Richardson P.C.

(57) ABSTRACT

A method and system are provided for boosting power for a communications link between a base station and a user device, or user equipment, in a cellular communications network. In one embodiment, the communications link is a downlink between the base station and the user device established via a downlink channel having a full channel bandwidth including a number of sub-carrier frequencies. The base station determines whether a power boost is needed for a downlink to the user device. If so, the base station uses a subset of the sub-carrier frequencies from the full channel bandwidth as a reduced bandwidth channel, or sub-channel, for the downlink to the user device such that signal power is concentrated on the sub-carrier frequencies of the reduced channel bandwidth rather than spread across the sub-carrier frequencies of the full channel bandwidth. As a result, a power boost for the downlink is provided.

20 Claims, 7 Drawing Sheets

(56) References Cited

U.S. PATENT DOCUMENTS

| | | |
|---|---|---|
| 2003/0123425 A1 | 7/2003 | Walton et al. |
| 2005/0272432 A1* | 12/2005 | Ji et al. ............ 455/449 |
| 2006/0203731 A1 | 9/2006 | Tiedemann et al. |
| 2007/0047569 A1 | 3/2007 | Das et al. |
| 2008/0025337 A1 | 1/2008 | Smith et al. |
| 2008/0037496 A1 | 2/2008 | Smith et al. |
| 2008/0039129 A1 | 2/2008 | Li et al. |
| 2008/0062944 A1 | 3/2008 | Smith et al. |
| 2008/0089286 A1 | 4/2008 | Malladi et al. |
| 2008/0165836 A1 | 7/2008 | Landau et al. |
| 2008/0233995 A1 | 9/2008 | Shiu et al. |
| 2008/0240151 A1 | 10/2008 | Chitrapu et al. |
| 2008/0287155 A1 | 11/2008 | Xu et al. |
| 2009/0003266 A1 | 1/2009 | Stolyar et al. |
| 2010/0035555 A1* | 2/2010 | Bala et al. ............ 455/63.1 |

FOREIGN PATENT DOCUMENTS

| | | |
|---|---|---|
| JP | 2003-530009 | 10/2003 |
| WO | 2006004968 | 1/2006 |
| WO | 2006/126616 | 11/2006 |
| WO | 2007/059196 | 5/2007 |

OTHER PUBLICATIONS

Office Action issued in Japanese Application No. 2011-522559 on Nov. 21, 2013; 10 pages.
Office Action issued in U.S. Appl. No. 12/336,901 on Sep. 17, 2013.
International Search Report for IB/2009/006472, mailed Oct. 28, 2009.
Office Action issued in U.S. Appl. No. 12/336,901 on Jun. 20, 2012.
Office Action issued in U.S. Appl. No. 12/336,901 on Feb. 5, 2013.
Office Action issued in Chinese Application No. 200980140604.3 on Apr. 1, 2013; 17 pages.
Office Action issued in U.S. Appl. No. 12/336,901 on Apr. 1, 2014.
Notice of Allowance issued in Chinese Application No. 200980140604.3 on Feb. 18, 2014; 4 pages.
Extended European Search Report issued in European Application No. 09806502.2 on May 12, 2014; 5 pages.

* cited by examiner

PERFORMING A POWER BOOST IN A WIRELESS COMMUNICATION SYSTEM

This application is a continuation of U.S. application Ser. No. 12/336,901, filed on Dec. 17, 2008, which claims the benefit of U.S. provisional patent application Ser. Nos. 61/188,569 and 61/188,609, both of which were filed Aug. 11, 2008 and the disclosures of which are hereby incorporated herein by reference in their entireties.

FIELD OF THE INVENTION

The present invention relates to providing a power boost for a wireless communication link.

BACKGROUND OF THE INVENTION

In all cellular communications networks, there are opposing requirements for high spectrum efficiency and high area availability, or coverage. As a Fourth Generation (4G) technology, Long Term Evolution (LTE) is expected to provide high spectrum efficiency. Namely, LTE is expected to provide three to four times higher spectrum efficiency than High-Speed Downlink Packet Access (HSDPA) Release 6 for the downlink, and two to three times higher spectrum efficiency than High-Speed Uplink Packet Access (HSUPA) Release 6 for the uplink. In addition, as with any cellular communications network, LTE must provide 90%-95% coverage, which is referred to as Carrier Grade of Service (CGoS) for coverage. The requirements for high spectrum efficiency and coverage are opposing in that a small frequency reuse factor (N) is desired in order to achieve high spectrum efficiency but, in general, a high frequency reuse factor (N) is desired in order to decrease out-of-cell interference and therefore increase coverage. A maximum spectrum efficiency is achieved when the frequency reuse factor (N) is 1 such that the entire spectrum is reused in each cell of the cellular communications network. However, when the frequency reuse factor (N) is 1, out-of-cell interference is at its maximum and, therefore, coverage is at its worst.

Spectrum efficiency can be roughly determined by a minimum Signal-to-Interference-plus-Noise (SINR) needed for a wireless communication link, or airlink, to survive in the cellular communications network. For example, an Advanced Mobile Phone System (AMPS) typically requires a SINR of greater than or equal to +18 decibels (dB). Thus, in order to achieve the CGoS in AMPS, a very large frequency reuse factor of N=21 is needed in order to achieve the needed SINR. As another example, Code Division Multiple Access (CDMA) system can operate with SINR values as low as −14 dB as a result of the processing gain due to the spreading and dispreading process. As such, a frequency reuse factor of N=1 can be used in the CDMA system.

For LTE, a minimum SINR needed to maintain a wireless communication link is approximately −5 dB. However, for a fully loaded LTE network having a frequency reuse factor of N=1, test results show that the SINR at cell edges can be lower than −12 dB. Therefore, there is a need for a system and method for improving coverage in an LTE cellular communications network while maintaining high frequency reuse.

SUMMARY OF THE INVENTION

The present invention relates to boosting power for a communications link between a base station and a user device, or user equipment, over a communications link channel in a cellular communications network. In one embodiment, the communications link is a downlink between the base station and the user device. The downlink is established via a downlink channel, such as an Orthogonal Frequency Division Multiple Access (OFDMA) channel, having a full channel bandwidth including a number of sub-carrier frequencies. The base station determines whether a power boost for the downlink from the base station to the user device is needed. If so, the base station uses a subset of the sub-carrier frequencies from the full channel bandwidth as a reduced bandwidth channel, or sub-channel, for the downlink to the user device. By using the reduced bandwidth channel, signal power is concentrated on the sub-carrier frequencies of the reduced channel bandwidth rather than spread across the sub-carrier frequencies of the full channel bandwidth. As a result, a power boost for the downlink to the user device is provided.

In another embodiment, a downlink between the base station and the user device is established via a downlink channel, such as an OFDMA channel, having a full channel bandwidth including a number of sub-carrier frequencies. Further, each sector of each cell in the cellular communications network is assigned a different frequency set of the sub-carrier frequencies of the full channel bandwidth. The base station determines whether a power boost for the downlink from the base station to the user device is needed. If so, the base station selects at least a subset of the frequency set assigned to a serving sector of the user device to provide a reduced bandwidth channel, or sub-channel, to be used for the downlink to the user device. As a result, signal power is concentrated on the sub-carrier frequencies in the reduced bandwidth channel rather than spread across the full channel bandwidth of the downlink channel, thereby providing a power boost for the downlink to the user device.

In another embodiment, the communications link is an uplink between the base station and the user device. The uplink is established via an uplink channel, such as a Single-Carrier Frequency Division Multiple Access (SC-FDMA) channel, having a full channel bandwidth including a number of sub-carrier frequencies. The base station determines whether a power boost for the uplink from the user device to the base station is needed. If so, the base station identifies a subset of the sub-carrier frequencies from the full channel bandwidth to use as a reduced bandwidth channel, or sub-channel, for the uplink from the user device to the base station. As a result, signal power is concentrated on the sub-carrier frequencies in the reduced bandwidth channel rather than spread across the full channel bandwidth of the uplink channel, thereby providing a power boost for the uplink from the user device.

In another embodiment, an uplink between the base station and the user device is established via an uplink channel, such as a SC-FDMA channel, having a full channel bandwidth including a number of sub-carrier frequencies. Further, each sector of each cell in the wireless communication network is assigned a different frequency set of the sub-carrier frequencies of the full channel bandwidth. The base station determines whether a power boost for an uplink from the user device to the base station is needed. If so, the base station selects at least a subset of the frequency set assigned to a serving sector of the user device to provide a reduced bandwidth channel, or sub-channel, to be used for the uplink from the user device to the base station. As a result, signal power is concentrated on the sub-carrier frequencies in the reduced bandwidth channel rather than spread across the full channel bandwidth of the uplink channel, thereby providing a power boost for the uplink from the user device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
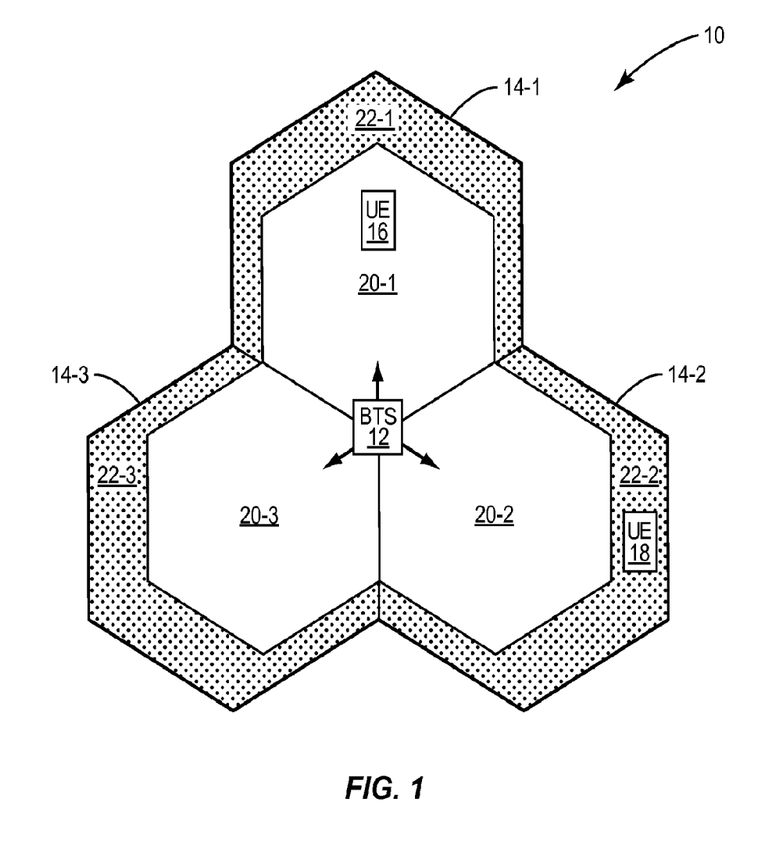
FIG. 1 illustrates a cell of a cellular communications network according to one embodiment of the present invention.

FIG. 1 illustrates a cell 10 of a cellular communications network according to one embodiment of the present invention. For the discussion herein, the cellular communications network is a Long Term Evolution (LTE) cellular communications network. However, the present invention is not limited thereto. The present invention is applicable to any type of cellular communications network or wireless communications network having a downlink or uplink channel including multiple sub-carrier frequencies over which data is communicated. In general, the cell 10 is served by a base station (BTS) 12, which, for LTE, may also be referred to as an enhanced node B (eNode B). The cell 10 includes a number of sectors 14-1, 14-2, and 14-3, which are generally referred to herein as sectors 14. While the cell 10 of this embodiment includes three sectors 14, the present invention is not limited thereto. The cell 10 may include any number of one or more sectors 14. A user equipment (UE) 16 is located within the sector 14-1 of the cell 10. As such, the sector 14-1 is also referred to herein as a serving sector of the UE 16. A UE 18 is located within the sector 14-2 of the cell 10. As such, the sector 14-2 is also referred to herein as a serving sector of the UE 18. The UEs 16 and 18 may be any type of device equipped with a cellular communications interface such as, but not limited to, a mobile telephone such as a mobile smart phone, a cellular network access card providing broadband access for a portable computer through a cellular communications network, or the like.

In general, the sectors 14-1, 14-2, and 14-3 include cell center areas 20-1, 20-2, and 20-3 and cell edge areas 22-1, 22-2, and 22-3, respectively. The cell center areas 20-1, 20-2, and 20-3 are generally referred to herein as cell center areas 20, and the cell edge areas 22-1, 22-2, and 22-3 are generally referred to herein as cell edge areas 22. In the preferred embodiment, the cell center areas 20 are generally areas within the cell 10 in which a Signal-to-Interference-plus-Noise Ratio (SINR) is greater than to a predetermined threshold, and the cell edge areas 22 are generally areas within the cell 10 in which the SINR is less than or equal to the predetermined threshold. In one embodiment, the predetermined threshold is a minimum SINR needed to maintain a wireless communication link, or airlink, between the base station 12 and a UE within the cell 10. In another embodiment, the predetermined threshold is a minimum SINR needed to maintain a wireless communication link, or airlink, between the base station 12 and a UE within the cell 10 plus a predetermined margin.

As discussed below in detail, a sub-channelization with power boost scheme is provided in order to provide a power boost to UEs, such as the UE 18, located within the cell edge areas 22 in order to improve SINRs for corresponding uplink and/or downlink channels to an acceptable level, which results in an improvement in the coverage of the cellular communications network. More specifically, for the embodiment where the cellular communications network is an LTE network, an Orthogonal Frequency Division Multiple Access (OFDMA) channel is used as a downlink channel between the base station 12 and the UEs located in the cell 10, including the UEs 16 and 18, and a Single-Carrier Frequency Division Multiple Access (SC-FDMA) channel is used as an uplink channel for uplinks from the UEs located in the cell 10 to the base station 12. As will be appreciated by one of ordinary skill in the art, both OFDMA and SC-FDMA are digital multi-carrier modulation schemes by which a number of closely-spaced sub-carrier frequencies are used to carry data. Thus, for both an OFDMA channel and an SC-FDMA channel, a bandwidth (referred to herein as a full bandwidth) of the channel includes a number of sub-bands having corresponding sub-carrier frequencies.

Further, in LTE, groups of twelve (12) consecutive or contiguous sub-carrier frequencies are used as carrier frequencies for corresponding resource blocks (RBs). An RB is a smallest unit that is allocated to a UE in an uplink or downlink channel. An RB is formed by twelve (12) consecutive sub-carrier frequencies in the frequency domain and fourteen (14) consecutive symbols in the time domain, which corresponds to 180 kilohertz (KHz) in the frequency domain and one (1) millisecond (ms), or one (1) sub-frame, in the time domain. Thus, using the UE 16 as an example, RBs in the OFDMA downlink channel are allocated to the UE 16 to provide a downlink from the base station 12 to the UE 16. Likewise, RBs in the SC-FDMA uplink channel are allocated to the UE 16 to provide an uplink from the UE 16 to the base station 12.

Using the UE 18 as an example, in order to provide a power boost for a downlink to the UE 18 located within the cell edge area 22-2, the base station 12 identifies a subset of the sub-carrier frequencies in the full bandwidth of the downlink channel as a reduced bandwidth channel for the downlink to the UE 18. For example, if the full channel bandwidth is 10 megahertz (MHz) or 50 RBs, the reduced bandwidth channel may have a bandwidth of ⅓ of the full channel bandwidth, which would be 3.33 MHz or 16 RBs. One or more RBs in the reduced bandwidth channel are allocated to the UE 18 to provide the downlink from the base station 12 to the UE 18. By using the reduced bandwidth channel for the downlink and by transmitting at full transmit power or substantially full transmit power, transmit power density, or signal power density, is concentrated on the sub-carrier frequencies in the reduced bandwidth channel rather than spread across the sub-carrier frequencies in the full bandwidth of the downlink channel. As a result, a power boost is provided for the downlink to the UE 18. Using the example above, if the reduced bandwidth channel has a bandwidth that is ⅓ of the full channel bandwidth, the power boost per sub-carrier, or per tone, in the reduced bandwidth channel is approximately 3× or 4.77 dB. In a similar manner, a power boost may be provided to the uplink from the UE 18 to the base station 12.

Figure 2A:
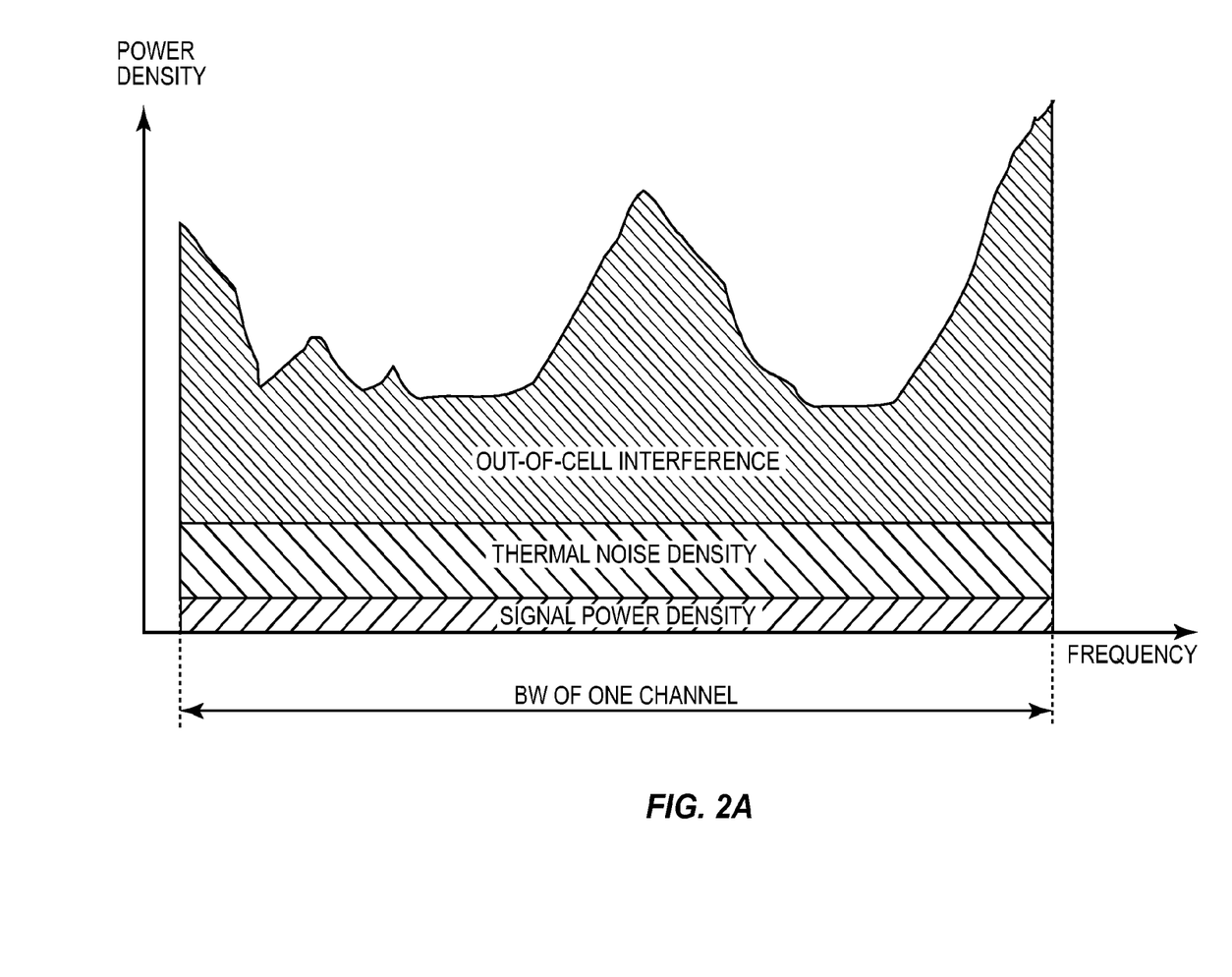
FIGS. 2A and 2B graphically illustrate a power boost according to one embodiment of to the present invention.
Figure 2B:
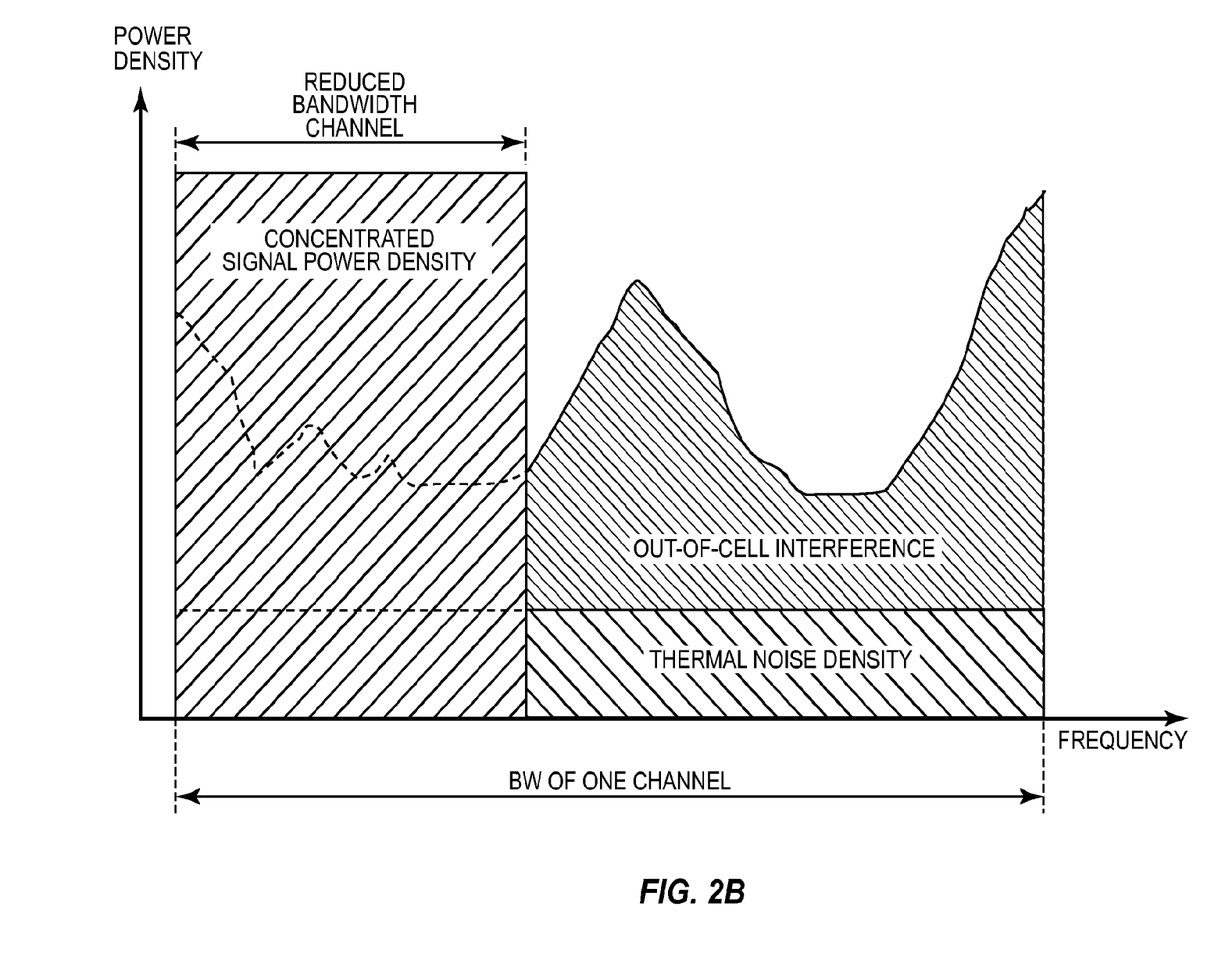

FIGS. 2A and 2B graphically illustrate a power boost according to one embodiment of the present invention. Specifically, FIG. 2A illustrates a signal power density, thermal noise density, and out-of-cell interference without a power boost. As shown, the signal power density is spread across the full channel bandwidth. FIG. 2B illustrates signal power density, thermal noise density, and out-of-cell interference after a power boost according to one embodiment of the present invention. As illustrated, the signal power density is concentrated on a reduced bandwidth channel rather than spread across the full bandwidth of the channel to effectively provide a power boost. The reduced bandwidth channel is a sub-channel of the downlink channel. A UE located in the cell edge area 22 may be allocated a number of RBs in the reduced bandwidth channel such that a power boost is provided for the uplink/downlink for the UE. While in this example the reduced bandwidth channel is formed by a number of consecutive or contiguous sub-carrier frequencies in the full channel bandwidth of the downlink channel, the present invention is not limited thereto. The sub-carrier frequencies forming the reduced bandwidth channel may be one or more contiguous sub-carrier frequencies, one or more non-contiguous sub-carrier frequencies, or a combination thereof.

By concentrating the signal power density, the SINR per sub-carrier frequency, or SINR per tone, is substantially increased as compared to the SINR of the full bandwidth channel. Specifically, the SINR per-channel ($SINR_{CHANNEL}$) is defined as:

$$SINR_{CHANNEL} = \frac{P_{FULL\_CHANNEL\_BW}}{\text{Interference}_{FULL\_CHANNEL\_BW} + \text{Thermal\_Noise}_{FULL\_CHANNEL\_BW}},$$

where $P_{FULL\_CHANNEL\_BW}$ is the total signal power within the full channel bandwidth, $\text{Interference}_{FULL\_CHANNEL\_BW}$ is the total interference within the full channel bandwidth, and $\text{Thermal\_Noise}_{FULL\_CHANNEL\_BW}$ is the thermal noise power within the full channel bandwidth. The SINR per sub-carrier frequency, or SINR per tone, ($SINR_{TONE}$) is defined as:

$$SINR_{TONE} = \frac{P_{TONE\_BW}}{\text{Interference}_{TONE\_BW} + \text{Thermal\_Noise}_{TONE\_BW}},$$

where $P_{TONE\_BW}$ is the total signal power within the bandwidth of the tone, $\text{Interference}_{TONE\_BW}$ is the total interference within the bandwidth of the tone, and $\text{Thermal\_Noise}_{TONE\_BW}$ is the thermal noise power within the bandwidth of the tone. When the signal power is uniformly spread across the full bandwidth as shown in FIG. 2A, the SINR per-channel ($SINR_{CHANNEL}$) is equal to the SINR per tone ($SINR_{TONE}$). In contrast, when the signal power is concentrated on a reduced bandwidth channel as shown in FIG. 2B, the SINR per tone ($SINR_{TONE}$) is defined as:

$$SINR_{TONE} = SINR_{CHANNEL} + Power\_Boost,$$

where Power_Boost is a gain [dB] resulting from the concentration of the signal power in the reduced bandwidth channel. In general, the power boost is related to a ratio of the full channel bandwidth and the reduced channel bandwidth of the reduced bandwidth channel. Specifically, the power boost may be defined as:

$$\text{Power\_Boost} = 10 \cdot \log_{10}\left(\frac{\text{full\_channel\_bandwidth}}{\text{reduced\_channel\_bandwidth}}\right)[dB].$$

In the preferred embodiment, coordination is desired in order to prevent neighboring sectors from boosting power on the same sub-carrier frequencies at the same time, in which case there would be no gain in SINR. More specifically, in one embodiment, each sector in a cell is statically assigned a different set of the sub-carrier frequencies of the full channel bandwidth for use with power boosts. Specifically, for LTE, each sector in a cell is statically assigned a different set of RB sub-carrier frequencies. The sets of sub-carrier frequencies assigned to the sectors are referred to herein as frequency sets. Neighboring sectors are assigned different frequency sets such that collisions of power boosted sub-carriers from neighboring sectors are avoided. Note that these different frequency sets are only applicable to UEs in the cell edge areas 22. The full channel bandwidth is used for UEs in the cell center areas 20.

Figure 3:
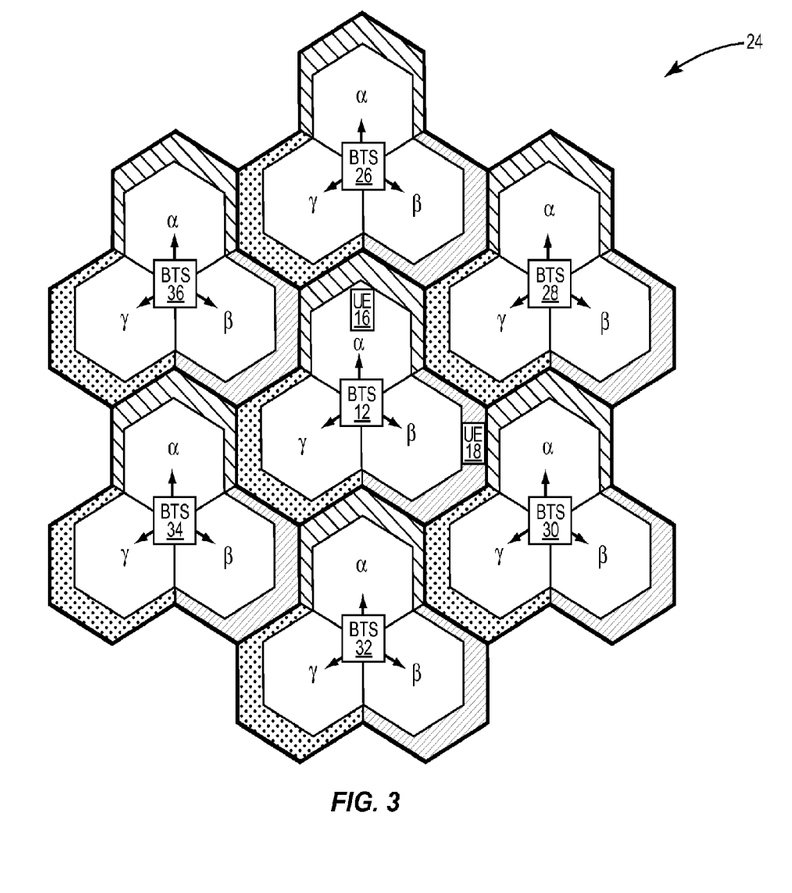
FIG. 3 illustrates a number of cells in a cellular communications network wherein each sector is assigned a different subset of sub-carriers in a downlink channel and/or uplink channel for use with power boosting according to one embodiment of the present invention.

FIG. 3 illustrates portion of a cellular communications network 24 including a number of cells served by base stations 12 and 26-36, wherein different frequency sets have been assigned to neighboring sectors for use when providing power boosts according to one embodiment of the present invention. As illustrated, each cell includes an alpha ($\alpha$) sector, a beta ($\beta$) sector, and a gamma ($\gamma$) sector. The alpha ($\alpha$) sectors are assigned a first frequency set, the beta ($\beta$) sectors are assigned a second frequency set, and the gamma ($\gamma$) sectors are assigned a third frequency set of the full channel bandwidth of the downlink and/or uplink channel. Note that the first, the second, and the third frequency sets are disjoint frequency sets. Thus, for these exemplary cells, neighboring sectors are assigned different frequency sets. As a result, collisions between high power sub-carriers resulting from power boosts in neighboring cells are avoided.

In FIG. 3, the cells and sectors of the cellular communications network 24 are uniform. However, in real world implementations, the cells and sectors may be non-uniform (i.e., may have different shapes). Based on graph theory, in most cases, four different frequency sets will be sufficient to ensure that no neighboring sectors use the same frequency sets. Further, based on graph theory, five different frequency sets will be sufficient to ensure that no neighboring sectors use the same frequency sets even in the most non-uniform situation. Thus, while FIG. 3 illustrates an embodiment where three different frequency sets are used, three, four, or five different frequency sets may be used. In order to maximize frequency reuse, in the preferred embodiment, only three frequency sets are used. As such, in order to avoid collisions of high power sub-carrier frequencies resulting from power boosts on the same sub-carrier frequencies in neighboring sectors, a dynamic avoidance scheme may be used. More specifically, since statically assigning each sector one of three disjoint frequency sets may not be sufficient to avoid collision of high power sub-carrier frequencies resulting from power boosts in neighboring sectors in a non-uniform cellular communications network, a dynamic avoidance scheme may be used. For dynamic avoidance, using the UE 18 as an example, sub-carrier frequencies from the frequency set assigned to the serving sector 14-2 of the UE 18 currently experiencing the lowest out-of-cell interference are selected for allocation to the UE 18 for the uplink/downlink for the UE 18. By using the sub-carrier frequencies having the lowest out-of-cell interference, the base station 12 ensures that the sub-carrier frequencies used for the uplink/downlink for the UE 18 are not currently being used for a power boost in a neighboring sector of the serving sector 14-2 of the UE 18.

Figure 4:
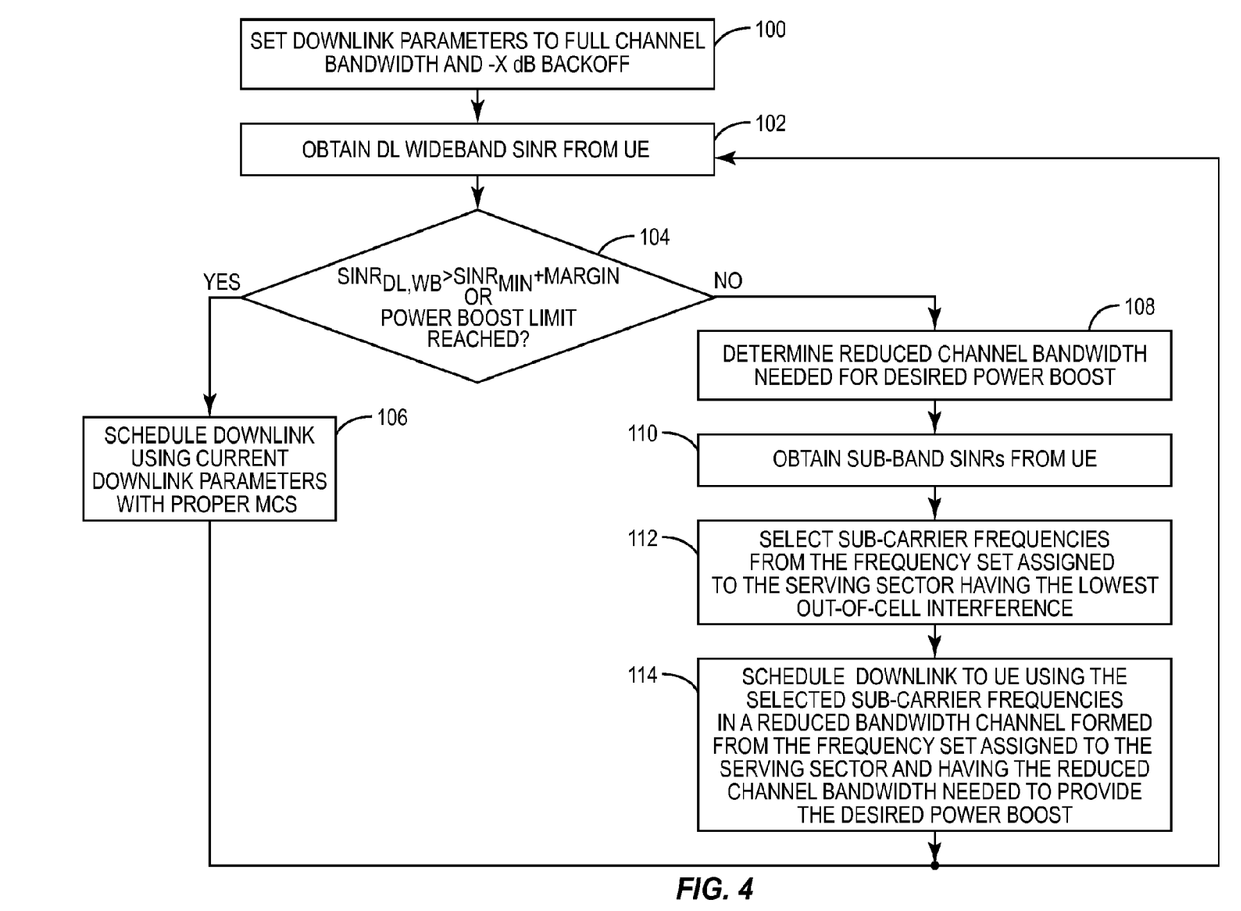
FIG. 4 is a flow chart illustrating operation of a base station to provide power boosting for a downlink according to one embodiment of the present invention.

FIG. 4 is a flow chart illustrating the operation of a base station to provide a power boost for a downlink to a UE according to one embodiment of the present invention. For this example, the base station is the base station 12. However, this discussion is equally applicable to other base stations, such as the base stations 26-36, in the cellular communications network 24. First, the base station 12 sets initial downlink parameters for a UE to full channel bandwidth and −X dB power backoff (step 100). Regarding the −X dB power backoff, in this embodiment, UEs located in the cell center areas 20 do not receive full transmit power in order to restrict out-of-cell interference over the full channel bandwidth. Rather, the UEs located in the cell center areas 20 receive full transmit power −X dB backoff. For example, for a 10 MHz channel and a power amplifier having a total output power of 20 Watts (W), the full power per RB (FPRB) is 20W/50RB, which is equal to 0.4 W per RB. Full queue UEs generally get a −3 dB power backoff per RB such that the downlink power per RB for full queue UEs is FPRB −3 dB. However, full queue UEs extremely close to the base station 12 may receive further power backoff such as, for example −4 dB, −5 dB, or −6 dB power backoff. Specifically, in LTE, the modulation and coding scheme (MCS) providing the highest data rate is 64 Quadrature Amplitude Modulation (QAM) at 5/6 coding rate. For this MCS, a SINR of +19 dB is needed. However, UEs close to the base station 12 may have a SINR substantially greater than +19 dB. As such, for those UEs having SINRs greater than +19 dB, a higher power backoff may be used. For example, a full queue UE having a downlink SINR of +25 dB may get a −6 dB power backoff. For Voice-over-Internet-Protocol (VoIP) UEs, the least number of RBs and lowest power level that can satisfy their data rate may be used.

Once the initial downlink parameters have been set, the base station 12 obtains a downlink (DL) wideband SINR from the UE (step 102). More specifically, in one embodiment, the base station 12 sends a request to the UE for the UE to report a Channel Quality Index (CQI) including the DL wideband SINR to the base station 12. In response, the UE sends the CQI to the base station 12. The base station 12 then determines whether the DL wideband SINR ($SINR_{DL,WB}$) is greater than a predetermined threshold or whether a power boost limit has been reached (step 104). In this embodiment, the predetermined threshold is a minimum SINR ($SINR_{MIN}$) plus a margin. The minimum SINR ($SINR_{MIN}$) is a minimum SINR needed to maintain a wireless communication link with the base station 12, which for LTE is approximately −5 dB when the most robust modulation scheme (Quadrature Phase Shift Keying (QPSK) at a 1/12 coding rate) is used. The margin may vary depending on the particular implementation and may also vary from cell to cell. In one embodiment, the margin is set equal to the power boost limit, or maximum allowable power boost. The power boost limit may be a system-configurable limit to the amount of power boost that may be given to UEs. The power boost limit may or may not be the same for all cells. As one example, the power boost limit, or the maximum amount of power boost, may be in the range of and including 3 dB to 4.77 dB, and the margin is set equal to the power boost limit.

If the DL wideband SINR ($SINR_{DL,WB}$) is greater than the sum of the minimum SINR ($SINR_{MIN}$) plus the margin or if the power boost limit has been reached, the base station 12 schedules one or more downlink transmissions to the UE using current downlink parameters with a proper MCS for the downlink to the UE (step 106). For the first iteration, the current downlink parameters are those set in step 100. Therefore, for the first iteration, if the DL wideband SINR ($SINR_{DL,WB}$) is greater than the sum of the minimum SINR ($SINR_{MIN}$) plus the margin, the UE is determined to be located in the cell center area 20 of the serving sector of the UE. As such, the base station 12 allocates one or more RBs to the UE during one or more Transmit Time Intervals (TTIs) using the full channel bandwidth at −X dB power backoff to provide the downlink to the UE. For subsequent iterations, the current downlink parameters will depend on whether a power boost has been performed. After step 106, the process returns to step 102 and is repeated.

Returning to step 104, if the DL wideband SINR ($SINR_{DL,WB}$) is not greater than the sum of the minimum SINR ($SINR_{MIN}$) plus the margin and the power boost limit has not been reached, the base station 12 determines a reduced channel bandwidth needed to provide a desired power boost for the downlink to the UE (step 108). For example, in the embodiment where each sector is assigned one of three disjoint frequency sets from the full channel bandwidth, the largest reduced channel bandwidth that may be used is ⅓ of the full channel bandwidth. Using ⅓ of the full channel bandwidth results in a 3× or 4.77 dB power boost per sub-carrier frequency, or per tone. Thus, the base station 12 may first determine if a power boost of 4.77 dB is sufficient to increase the downlink SINR for the UE to the minimum SINR ($SINR_{MIN}$) plus the margin. If so, the base station 12 may select ⅓ of the full channel bandwidth as the reduced channel bandwidth needed to provide the desired power boost. However, if using ⅓ of the full channel bandwidth does not provide sufficient power boost, the base station 12 may select a reduced channel bandwidth that is less than ⅓ of the full channel bandwidth that provides the desired power boost. Note that the reduced channel bandwidth may be limited by the maximum power boost allowed.

In this embodiment, the base station 12 also obtains sub-band SINRs for the full channel bandwidth from the UE (step 110). More specifically, for LTE, the base station 12 may send a request to the UE for the UE to report sub-band CQIs. In response, the UE sends sub-band CQIs, which include the sub-band SINRs, to the base station 12. The base station 12 then selects a number of sub-carrier frequencies from a frequency set assigned to a serving sector of the UE that are currently experiencing a lowest out-of-cell interference based on the sub-band SINRs (step 112). Again, the frequency set assigned to the serving sector is a set of the sub-carrier frequencies in the full channel bandwidth that have been assigned to the serving sector for use when providing power boosts. For LTE, the frequency set assigned to the serving sector may be defined as a number of RB sub-carrier frequency groups. In one embodiment, the base station 12 compares the sub-band SINRs of the sub-carrier frequencies in the frequency set assigned to the serving sector to a threshold value. The sub-carrier frequencies having sub-band SINRs greater than the threshold value are selected. In another embodiment, the base station 12 selects the sub-carriers from the frequency set having the M highest sub-band SINRs, where M may correspond to a number of RBs desired for the downlink to the UE. By selecting the sub-carrier frequencies for the sub-bands having the lowest out-of-cell interference, the base station 12 avoids collision of high power sub-carrier frequencies resulting from power boosts in neighboring sectors. As discussed above, this is especially beneficial for non-uniform cellular communications networks.

The base station 12 then schedules the downlink to the UE using the selected sub-carrier frequencies in a reduced bandwidth channel, the reduced bandwidth channel formed from the frequency set of the full channel bandwidth of the downlink channel assigned to the serving sector and having the reduced channel bandwidth needed to provide the desired power boost (step 114). While in this embodiment the reduced bandwidth channel has a bandwidth equal to the reduced channel bandwidth determined in step 108, in another embodiment, bandwidth may be equal to or less than the reduced channel bandwidth determined in step 108 such that at least the desired power boost is provided. In order to schedule the downlink, the selected sub-carrier frequencies in the reduced bandwidth channel are allocated for the downlink to the UE during one TTI. Note that, depending on the bandwidth of the reduced bandwidth channel and the number of RBs needed for the downlink to the UE, one or more additional UEs also in need of a power boost may be scheduled in the same TTI using the reduced channel bandwidth. As a first example, the full channel bandwidth of the downlink channel may be 10 MHz or 50 RBs, and the reduced channel bandwidth needed to provide the desired power boost may be ⅓ of the full channel bandwidth or 16 RBs. This will provide a 3× or 4.77 dB power boost. If the frequency set assigned to the serving sector of the UE is ⅓ of the full channel bandwidth, then the frequency set is used as the reduced bandwidth channel. Further, assuming for this example that each cell edge UE scheduled in the TTI using the reduced bandwidth channel is allocated two RBs, then eight cell edge UEs may be scheduled in the TTI.

As a second example, the full channel bandwidth of the downlink channel is 10 MHz or 50 RBs and the reduced channel bandwidth needed to provide the desired power boost may be ⅕ of the full channel bandwidth or 10 RBs. This will provide a 5× or 7 dB power boost. If the frequency set assigned to the serving sector of the UE is ⅓ of the full channel bandwidth, then a subset of the sub-carrier frequencies in the frequency set assigned to the serving sector is selected to provide the reduced bandwidth channel having a bandwidth that is ⅕ of the full channel bandwidth. Again, assuming that each cell edge UE scheduled in the TTI using the reduced channel bandwidth is allocated two RBs, then five cell edge UEs may be scheduled in the TTI. Thus, in general, as more power boost is needed, the bandwidth of the reduced channel bandwidth decreases, which generally results in fewer UEs being scheduled in the TTI using the reduced bandwidth channel. Note that a theoretical hard power boost limit may be achieved with a reduced channel bandwidth of one (1) RB frequency group, which would provide a power boost of 50× or 17 dB.

At this point, the process returns to step 102. The base station 12 continues to monitor the downlink wideband SINR for the UE. If further power boosts are needed and the power boost limit has not been reached, the base station 12 may provide additional power boost by further decreasing the bandwidth of the reduced bandwidth channel used for the downlink to the UE.

Figure 5:
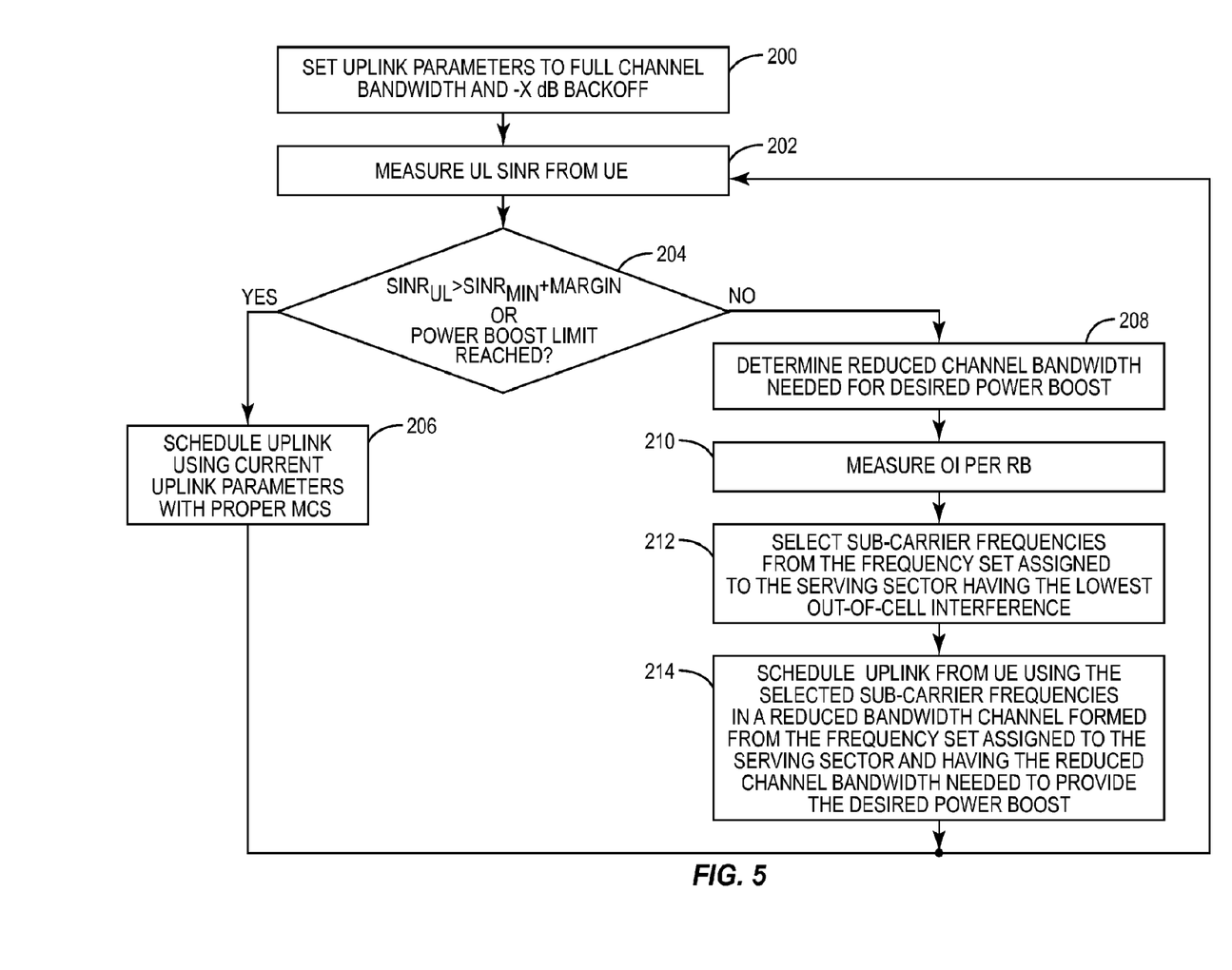
FIG. 5 is a flow chart illustrating operation of a base station to provide power boosting for an uplink according to one embodiment of the present invention.

FIG. 5 is a flow chart illustrating the operation of a base station to provide a power boost for an uplink from a UE to the base station according to one embodiment of the present invention. For this example, the base station is the base station 12. However, this discussion is equally applicable to the other base stations, such as the base stations 26-36, in the cellular communications network 24. First, the base station 12 sets initial uplink parameters for a UE to full channel bandwidth and −X dB power backoff (step 200). Once the initial uplink parameters have been set, the base station 12 measures, or otherwise obtains, an uplink SINR (SINR$_{UL}$) from the UE (step 202). The base station 12 then determines whether the uplink SINR (SINR$_{UL}$) is greater than a predetermined threshold or whether a power boost limit has been reached (step 204). In this embodiment, the predetermined threshold is a minimum SINR (SINR$_{MIN}$) plus a margin. The minimum SINR (SINR$_{MIN}$) is a minimum SINR needed to maintain a wireless communication link with the base station 12. The margin may vary depending on the particular implementation and may also vary from cell to cell. In one embodiment, the margin is set equal to the power boost limit, or maximum allowable power boost. The power boost limit may be a system-configurable limit to the amount of power boost that may be given to the UEs. The power boost limit may or may not be the same for all cells. As one example, the power boost limit, or the maximum amount of power boost, may be in the range of and including 3 dB to 4.77 dB, and the margin is set equal to the power boost limit.

If the uplink SINR (SINR$_{UL}$) is greater than the sum of the minimum SINR (SINR$_{MIN}$) plus the margin or if the power boost limit has been reached, the base station 12 schedules one or more uplink transmissions from the UE using the current downlink parameters with a proper MCS for the uplink from the UE (step 206). For the first iteration, the current uplink parameters are those set in step 200. Therefore, for the first iteration, if the uplink SINR (SINR$_{UL}$) is greater than the sum of the minimum SINR (SINR$_{MIN}$) plus the margin, the UE is determined to be located in the cell center area 20 of the serving sector of the UE. As such, the base station 12 allocates one or more RBs to the UE during one or more TTIs using the full channel bandwidth at −X dB power backoff to provide the uplink from the UE. For subsequent iterations, the current uplink parameters will depend on whether a power boost has been performed. After step 206, the process returns to step 202 and is repeated.

Returning to step 204, if the uplink SINR (SINR$_{UL}$) is not greater than the sum of the minimum SINR (SINR$_{MIN}$) plus the margin and the power boost limit has not been reached, the base station 12 determines a reduced channel bandwidth needed to provide a desired power boost for the uplink from the UE (step 208). For example, in the embodiment where each sector is assigned one of three disjoint frequency sets from the full channel bandwidth, the largest reduced channel bandwidth that may be used is ⅓ of the full channel bandwidth. Using ⅓ of the full channel bandwidth results in a 3× or 4.77 dB power boost per sub-carrier frequency, or per tone. Thus, the base station 12 may first determine if a power boost of 4.77 dB is sufficient to increase the downlink SINR for the UE to the minimum SINR (SINR$_{MIN}$) plus the margin. If so, the base station 12 may select ⅓ of the full channel bandwidth as the reduced channel bandwidth needed to provide the desired power boost. However, if using ⅓ of the full channel bandwidth does not provide sufficient power boost, the base station 12 may select a reduced channel bandwidth that is less than ⅓ of the full channel bandwidth that provides the desired power boost. Note that the reduced channel bandwidth may be limited by the maximum power boost allowed.

In this embodiment, the base station 12 also measures, or otherwise obtains, out-of-cell interference per RB for the full channel bandwidth (step 210). In one embodiment, the base station 12 measures the out-of-cell interference per resource block using an LTE Overload Indicator (OI). The base station 12 then selects a number of sub-carrier frequencies from a frequency set assigned to a serving sector of the UE that are currently experiencing a lowest out-of-cell interference based on the out-of-cell interference measurements (step 212). Again, the frequency set assigned to the serving sector is a set of the sub-carrier frequencies in the full channel bandwidth that have been assigned to the serving sector for use when providing power boosts. For LTE, the frequency set assigned to the serving sector may be defined as a number of RB sub-carrier frequency groups. In one embodiment, the base station 12 compares the measured out-of-cell interference for each RB to a threshold value. The sub-carrier frequencies of RBs having out-of-cell interference less than the threshold values are selected. In another embodiment, the base station 12 selects the sub-carrier frequencies of the RBs having the M lowest out-of-cell interference measurements, where M may correspond to a number of RBs desired for the uplink from the UE. By selecting the sub-carrier frequencies for the RBs having the lowest out-of-cell interference, the base station 12 avoids collision of high power sub-carrier frequencies resulting from power boosts in neighboring sectors. As discussed above, this is especially beneficial for non-uniform cellular communications networks.

The base station 12 then schedules the uplink to the UE using the selected sub-carrier frequencies in a reduced bandwidth channel, the reduced bandwidth channel formed from the frequency set of the full channel bandwidth of the uplink channel assigned to the serving sector and having the reduced channel bandwidth needed to provide the desired power boost (step 214). While in this embodiment the reduced bandwidth channel has a bandwidth equal to the reduced channel bandwidth determined in step 208, in another embodiment, bandwidth may be equal to or less than the reduced channel bandwidth determined in step 208 such that at least the desired power boost is provided. In order to schedule the uplink, the selected sub-carrier frequencies in the reduced bandwidth channel are allocated for the uplink from the UE during one TTI. Note that depending on the bandwidth of the reduced bandwidth channel and the number of RBs needed for the uplink from the UE, one or more additional UEs also needing a power boost may be scheduled in the same TTI using the reduced channel bandwidth. As a first example, the full channel bandwidth of the uplink channel may be 10 MHz or 50 RBs and the reduced channel bandwidth needed to provide the desired power boost may be 1/3 of the full channel bandwidth or 16 RBs. This will provide a 3× or 4.77 dB power boost. If the frequency set assigned to the serving sector of the UE is 1/3 of the full channel bandwidth, then the frequency set is used as the reduced bandwidth channel. Further, assuming for this example that each cell edge UE scheduled in a TTI using the reduced bandwidth channel is allocated two RBs, then eight cell edge UEs may be scheduled in the TTI.

As a second example, the full channel bandwidth of the uplink channel is 10 MHz or 50 RBs and the reduced channel bandwidth needed to provide the desired power boost may be 1/5 of the full channel bandwidth or 10 RBs. This will provide a 5× or 7 dB power boost. If the frequency set assigned to the serving sector of the UE is 1/3 of the full channel bandwidth, then a subset of the sub-carrier frequencies in the frequency set assigned to the serving sector are selected to provide the reduced bandwidth channel having a bandwidth that is 1/5 of the full channel bandwidth. Again, assuming that each cell edge UE scheduled in the TTI using the reduced channel bandwidth is allocated two RBs, then five cell edge UEs may be scheduled in the TTI. Thus, in general, as more power boost is needed, the bandwidth of the reduced channel bandwidth decreases, which generally results in fewer UEs being scheduled in the TTI using the reduced bandwidth channel. Note that a theoretical hard power boost limit may be achieved with a reduced channel bandwidth of one (1) RB frequency group, which would provide a power boost of 50× or 17 dB.

At this point, the process returns to step 202. The base station 12 continues to monitor the uplink SINR for the UE. If further power boosts are needed and the power boost limit has not been reached, the base station 12 may provide additional power boost by further decreasing the bandwidth of the reduced bandwidth channel used for the uplink to the UE.

Figure 6:
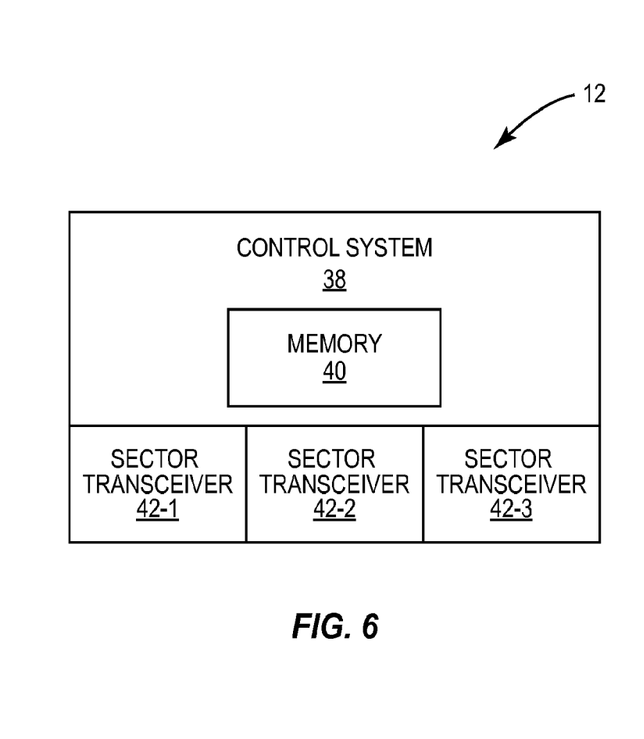
FIG. 6 is a block diagram of an exemplary base station.

FIG. 6 is a block diagram of an exemplary embodiment of the base station 12 of FIG. 1. However, this discussion is equally applicable to the other base stations, such as the base stations 26-36, in the cellular communications network 24. In general, the base station 12 includes a control system 38 having associated memory 40. In addition, in this embodiment, the base station 12 includes sector transceivers 42-1, 42-2, and 42-3 for the sectors 14-1, 14-2, and 14-3 (FIG. 1), respectively. The functionality of the base station 12 discussed above for providing power boosts may be implemented in hardware forming part of the control system 38, software stored in the memory 40, or a combination thereof.

Figure 7:
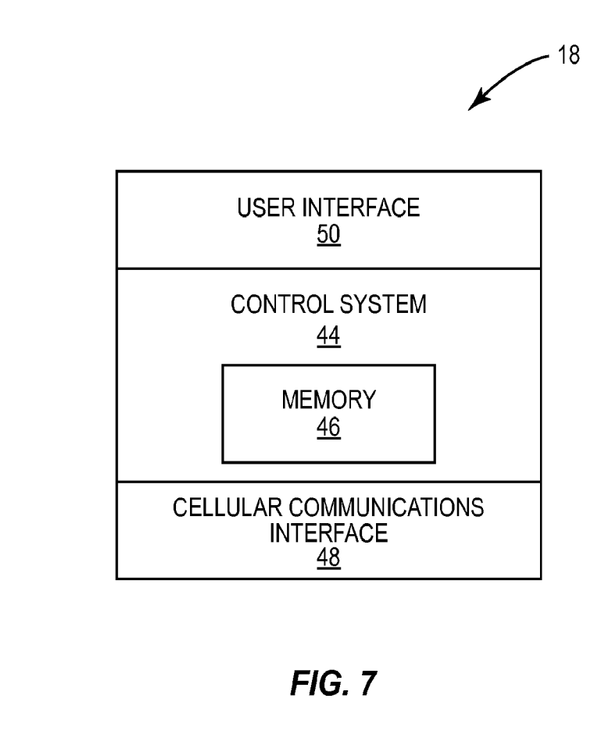
FIG. 7 is a block diagram of an exemplary user equipment (UE).

FIG. 7 is a block diagram of the UE 18 of FIG. 1. This discussion is equally applicable to other UEs in the cellular communications network 24. In general, the UE 18 includes a control system 44 having associated memory 46. In addition, the UE 18 includes a cellular communications interface 48. The functionality of the UE 18 discussed above with respect to power boosting may be implemented within a protocol stack of the cellular communications interface 48, implemented in software stored in the memory 46, or a combination thereof. The UE 18 may also include a user interface 50, which may include components such as, for example, one or more user input devices (e.g., a microphone, a keypad, or the like), one or more speakers, a display, or the like.

Those skilled in the art will recognize improvements and modifications to the preferred embodiments of the present invention. All such improvements and modifications are considered within the scope of the concepts disclosed herein and the claims that follow.

What is claimed is:

1. A user device in a cellular communications network, comprising:
　a transceiver providing a communications link between the user device and a base station, the user device located within a cell of the cellular communications network served by the base station via a communications link channel having a full channel bandwidth including a plurality of sub-carrier frequencies; and
　a processor associated with the transceiver and adapted to:
　　transmit a wideband channel quality index to the base station;
　　transmit a plurality of sub-band channel quality indices to the base station;
　　in response to a determination that a power boost is needed for a communications link between the base station and the user device, use a subset of the plurality of sub-carrier frequencies of the communications link channel as a reduced bandwidth channel for the communications link between the user device and the base station such that signal power is concentrated on the subset of the plurality of sub-carrier frequencies in the reduced bandwidth channel rather than distributed across the full channel bandwidth, thereby providing a power boost for the communications link to the user device;

wherein the determination that a power boost is needed for the communications link between the base station and the user device is based on the wideband channel quality index;

wherein the subset of the plurality of sub-carrier frequencies are determined based at least in part on the plurality of sub-band channel quality indices; and receive an indication of the subset of the plurality of sub-carrier frequencies of the communications link channel from the base station, the indication of the subset of the plurality of sub-carrier frequencies comprising an indication of a number of resource blocks, each resource block containing twelve sub-carrier frequencies, wherein the subset of the plurality of sub-carrier frequencies of the communications link channel is coordinated with at least one other base station, wherein the other base station uses a different subset of the plurality of sub-carrier frequencies.

2. The user device of claim 1, wherein the communications link channel is a downlink channel and the communications link is a downlink.

3. The user device of claim 2, wherein the downlink channel is an orthogonal frequency division multiple access (OFDMA) channel.

4. The user device of claim 1, wherein the communications link channel is an uplink channel and the communications link is an uplink.

5. The user device of claim 4, wherein the uplink channel is a single-carrier frequency division multiple access (SC-FDMA) channel.

6. The user device of claim 1, wherein the processor is adapted to receive a message from the base station, the message configuring the user device to report a plurality of sub-band channel quality indications.

7. The user device of claim 1, wherein the processor is adapted to use the communications link channel having the full channel bandwidth for the communications link to the user device if a power boost is not needed for the communications link between the base station and the user device.

8. The user device of claim 1, wherein the determination that a power boost is needed comprises a determination that a power boost is needed if the communications link signal-to-interference-plus-noise ratio (SINR) is less than a predetermined threshold.

9. The user device of claim 8, wherein the predetermined threshold is a minimum SINR needed to maintain a communications link with the base station plus a margin.

10. The user device of claim 1, wherein the processor is adapted to:
identify a number of sub-carrier frequencies from the at least a subset of a set of sub-carrier frequencies currently serving the user device that have a least amount of out-of-cell interference; and
use the number of sub-carrier frequencies during a transmit time interval for the communications link between the user device and the base station.

11. A method of operating a user device in a cellular communications network to provide a communications link between the user device and a base station, the user device located within a cell of the cellular communications network served by the base station via a communications link channel having a full channel bandwidth including a plurality of sub-carrier frequencies; the method comprising:

transmitting a wideband channel quality index to the base station;

transmitting a plurality of sub-band channel quality indices to the base station;

in response to a determination that a power boost is needed for a communications link between the base station and the user device, using a subset of the plurality of sub-carrier frequencies of the communications link channel as a reduced bandwidth channel for the communications link between the user device and the base station such that signal power is concentrated on the subset of the plurality of sub-carrier frequencies in the reduced bandwidth channel rather than distributed across the full channel bandwidth, thereby providing a power boost for the communications link to the user device;

wherein the determination that a power boost is needed for the communications link between the base station and the user device is based on the wideband channel quality index;

wherein the subset of the plurality of sub-carrier frequencies are determined based at least in part on the plurality of sub-band channel quality indices; and receiving an indication of the subset of the plurality of sub-carrier frequencies of the communications link channel from the base station, the indication of the subset of the plurality of sub-carrier frequencies comprising an indication of a number of resource blocks, each resource block containing twelve sub-carrier frequencies, wherein the subset of the plurality of sub-carrier frequencies of the communications link channel is coordinated with at least one other base station, wherein the other base station uses a different subset of the plurality of sub-carrier frequencies.

12. The method of claim 11, wherein the communications link channel is a downlink channel and the communications link is a downlink.

13. The method of claim 12, wherein the downlink channel is an orthogonal frequency division multiple access (OFDMA) channel.

14. The method of claim 11, wherein the communications link channel is an uplink channel and the communications link is an uplink.

15. The method of claim 14, wherein the uplink channel is a single-carrier frequency division multiple access (SC-FDMA) channel.

16. The method of claim 11, comprising receiving a message from the base station, the message configuring the user device to report a plurality of sub-band channel quality indications.

17. The method of claim 11, comprising using the communications link channel having the full channel bandwidth for the communications link to the user device if a power boost is not needed for the communications link between the base station and the user device.

18. The method of claim 11, wherein the determination that a power boost is needed comprises a determination that a power boost is needed if the communications link signal-to-interference-plus-noise ratio (SINR) is less than a predetermined threshold.

19. The method of claim 18, wherein the predetermined threshold is a minimum SINR needed to maintain a communications link with the base station plus a margin.

20. The method of claim 11, wherein using a subset of the plurality of sub-carrier frequencies of the communications link channel as a reduced bandwidth channel for the communications link between the user device and the base station comprises:
  identifying a number of sub-carrier frequencies from the at least a subset of a set of sub-carrier frequencies currently serving the user device that have a least amount of out-of-cell interference; and
  using the number of sub-carrier frequencies for the communications link between the user device and the base station.

* * * * *